United States Patent
Park et al.

(10) Patent No.: US 11,772,522 B2
(45) Date of Patent: Oct. 3, 2023

(54) RAIL DEVICE FOR VEHICLE SEAT

(71) Applicants: Hyundai Motor Company, Seoul (KR); Kia Corporation, Seoul (KR); DAS Co., Ltd., Gyeongju-si (KR)

(72) Inventors: Hyung Jin Park, Gwangmyeong-si (KR); Gil Ju Kim, Hwaseong-si (KR); Soo Hyun Moon, Hwaseong-si (KR); Ju Yeol Kong, Ansan-si (KR); Sung Hak Hong, Suwon-si (KR); Sang Do Park, Suwon-si (KR); Ga Be Nam, Seongnam-si (KR); Jae Chul Jung, Ulsan (KR); Jin Gu Park, Ulsan (KR)

(73) Assignees: Hyundai Motor Company, Seoul (KR); Kia Corporation, Seoul (KR); DAS Co., Ltd., Gyeongju-su (KR)

( * ) Notice: Subject to any disclaimer, the term of this patent is extended or adjusted under 35 U.S.C. 154(b) by 0 days.

(21) Appl. No.: 17/990,046

(22) Filed: Nov. 18, 2022

(65) Prior Publication Data
US 2023/0202353 A1    Jun. 29, 2023

(30) Foreign Application Priority Data

Dec. 23, 2021   (KR) .......................... 10-2021-0185923

(51) Int. Cl.
 *B60N 2/00*    (2006.01)
 *B60N 2/07*    (2006.01)

(52) U.S. Cl.
 CPC ......... *B60N 2/0722* (2013.01); *B60N 2/0715* (2013.01)

(58) Field of Classification Search
None
See application file for complete search history.

(56) References Cited

U.S. PATENT DOCUMENTS

| | | | | |
|---|---|---|---|---|
| 6,113,051 A | * | 9/2000 | Moradell | B60N 2/0715 296/68.1 |
| 11,059,390 B2 | * | 7/2021 | Hattori | B60N 2/0732 |
| 11,235,684 B2 | * | 2/2022 | Hagan | F16C 29/02 |
| 2005/0285008 A1 | * | 12/2005 | Beneker | F16C 29/04 248/430 |
| 2007/0069100 A1 | * | 3/2007 | Schuler | B60N 2/0705 248/430 |
| 2007/0090263 A1 | * | 4/2007 | Yamada | B60N 2/0825 248/429 |

(Continued)

*Primary Examiner* — Steven M Marsh
(74) *Attorney, Agent, or Firm* — Slater Matsil, LLP (57) ABSTRACT

An embodiment rail device includes an upper rail, a first bearing support on the upper rail, a lower rail, a bearing connection end on the lower rail and inserted into the first bearing support, a vertically elongated bearing contact adjustment hole on the lower rail, an upper bearing rotatably connected to the bearing connection end and in close contact with a floor of the first bearing support, a lower plate including a fastening groove that receives a lower end of the lower rail, a bearing shaft mounting hole on a wall surface portion of the fastening groove and matched with the bearing contact adjustment hole, a second bearing support outside the fastening groove and having an opened upper portion, a lower bearing rotatably disposed within the second bearing support, and a bearing shaft fastened to the bearing shaft mounting hole and the bearing contact adjustment hole by a screw.

16 Claims, 7 Drawing Sheets (56) References Cited

U.S. PATENT DOCUMENTS

| 2011/0012005 A1* | 1/2011 | Jahner | B60N 2/08 |
| | | | 248/429 |
| 2013/0193730 A1* | 8/2013 | Walter | B60N 2/07 |
| | | | 297/341 |

* cited by examiner

FIG. 8

RAIL DEVICE FOR VEHICLE SEAT

CROSS-REFERENCE TO RELATED APPLICATIONS

This application claims the benefit of Korean Patent Application No. 10-2021-0185923, filed on Dec. 23, 2021, which application is hereby incorporated herein by reference.

TECHNICAL FIELD

The present disclosure relates to a rail device for a vehicle seat.

BACKGROUND

In general, a vehicle seat includes a seat cushion on which a lower body is seated, a seat back on which an upper body leans, and a headrest for supporting a neck and a head.

In addition, the seat is mounted with a seat mechanism capable of changing a seat position according to the body shape and situation of a passenger, and one of the seat mechanisms may be a rail device capable of adjusting front and rear positions of the seat.

Figure 1:
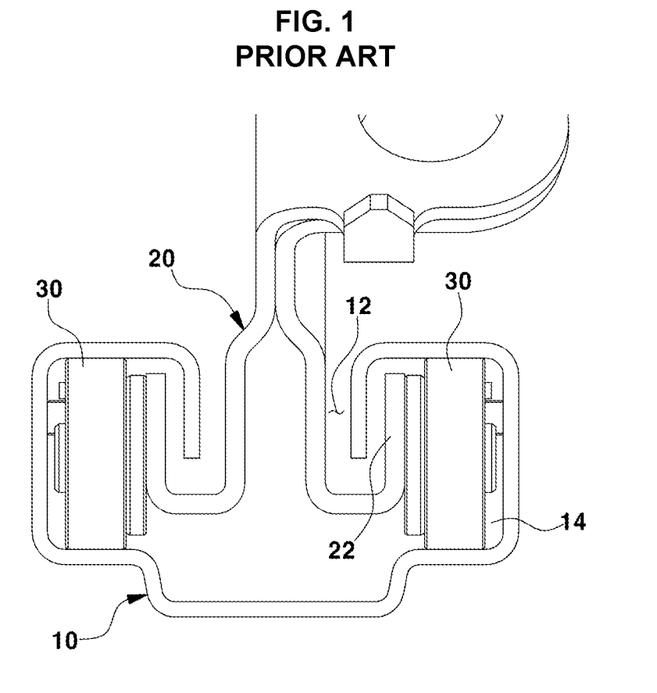
FIG. 1 is a cross-sectional diagram showing a conventional rail device for a vehicle seat.

FIG. 1 is a cross-sectional diagram showing a conventional rail device for a vehicle seat, and a reference numeral 10 indicates a lower rail.

The lower rail 10 is a fixed rail mounted to be fixed on a floor panel constituting an inner floor of the vehicle, and is provided in a structure in which an open part 12 is formed on an upper portion and bearing rolling spaces 14 are formed on both side portions.

An upper rail 20 is slidably fastened to the lower rail 10.

To this end, a bearing 30 is inserted into the bearing rolling space 14 of the lower rail 10, and a lower portion of the upper rail 20 is formed with a bearing connection plate 22 inserted through the open part 12 of the lower rail 10 and connected to the bearing 30.

At this time, a seat cushion of the configuration of the seat is mounted on an upper portion of the upper rail 20.

Accordingly, when the upper rail 20 moves forward and rearward, the bearing 30 connected to the bearing connection plate 22 slides along the bearing rolling space 14 of the lower rail 10, so that the upper rail 20 and the seat cushion mounted on the upper rail 20 may be moved to desired positions, and as a result, the front and rear positions of the seat may be adjusted.

However, the aforementioned conventional rail device has the following problems.

First, there is a problem in that a gap occurs between the bearing rolling space 14 and the bearing 30 due to a material of the lower rail 10 and a machining tolerance while manufacturing, so that the bearing 30 is not properly in close contact with upper and lower surfaces of the bearing rolling space 14, and thus the bearing 30 is vertically moved within the bearing rolling space 14 when the upper rail 20 moves forward and rearward, thereby causing noise due to the movement.

Second, there is a problem in that a height of the bearing rolling space 14 is manufactured to be smaller than a height of the bearing 30 due to the material of the lower rail 10 and the machining tolerance while manufacturing, so that the assembling in which the bearing 30 is inserted into the bearing rolling space 14 is impossible.

The above information disclosed in this background section is only for enhancement of understanding of the background of embodiments of the disclosure and accordingly it may include information that does not form the prior art that is already known to a person of ordinary skill in the art.

SUMMARY

The present disclosure relates to a rail device for a vehicle seat. Particular embodiments relate to a rail device for a vehicle seat that may smoothly perform a slide operation for adjusting a seat position without vertical movement and noise.

Embodiments of the present disclosure can solve problems in the art, and an embodiment of the present disclosure provides a rail device for a vehicle seat that may mount an upper bearing on a lower rail, mount a lower bearing on a lower plate, and dispose an upper rail between the upper bearing and the lower bearing to be movable, but assemble the upper rail to closely contact between the upper bearing and the lower bearing without a gap, so that the upper rail may be smoothly moved between the upper bearing and the lower bearing without vertical movement and occurrence of noise.

Embodiments of the present disclosure provide a rail device for a vehicle seat configured to include an upper rail in which an opening is formed on an inner portion and a first bearing support is formed inside the opening, a lower rail on which a bearing connection end inserted into the first bearing support through the opening is formed on an upper portion and a bearing contact adjustment hole vertically elongated is formed on a lower portion, an upper bearing rotatably connected to the bearing connection end and being in close contact with a floor of the first bearing support, a lower plate in which a fastening groove into which a lower end of the lower rail is inserted is formed on an outer portion, a bearing shaft mounting hole matched with the bearing contact adjustment hole is formed on a wall surface portion of the fastening groove, and a second bearing support with an opened upper portion is formed outside the fastening groove, a lower bearing rotatably disposed within the second bearing support, and a bearing shaft fastened to the bearing shaft mounting hole and the bearing contact adjustment hole by a screw by penetrating the center of the lower bearing from an outer surface of the second bearing support.

In addition, a lower rail guide hole vertically elongated is further formed on a lower portion of the lower rail and the lower plate is further formed with a lower rail mounting hole, so that a fixing bolt is inserted into and fastened to the lower rail guide hole and the lower rail mounting hole.

In addition, the lower plate is mounted with an electric drive device for moving the upper rail in front and rear directions and a connection plate connected to the drive device is formed on the inner portion of the upper rail.

The electric drive device is configured to include a motor mounted on the lower plate, a gear box connected to an output shaft of the motor, a lead screw fastened to the gear box to be rotatable in place, and a slider mounted on the connection plate so that the lead screw is rotatably fastened.

Preferably, a seat cushion fastening bracket for assembling with a seat cushion is mounted on an upper portion of the upper rail.

In addition, a height adjustment block is mounted on the bearing shaft, and a height adjustment bolt for pushing upward and tightening the height adjustment block is mounted on a bottom portion of the second bearing support.

Alternatively, a height adjustment block is mounted on the bearing shaft, and a height adjustment spring for pushing the height adjustment block upward is mounted on a floor of the second bearing support.

Through the above configuration, embodiments of the present disclosure provide the following effects.

According to embodiments of the present disclosure, it is possible to assemble the upper rail to closely contact between the upper bearing and the lower bearing without a gap, so that the upper rail may be smoothly moved between the upper bearing and the lower bearing without vertical movement and occurrence of noise, and thus the front and rear positions of the seat mounted on the upper rail may be smoothly adjusted without vertical movement and noise.

It is understood that the term "automotive" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the present disclosure, and wherein.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent sections of embodiments of the present disclosure throughout the several figures of the drawings.

DETAILED DESCRIPTION OF ILLUSTRATIVE EMBODIMENTS

Hereinafter, preferred embodiments of the present disclosure will be described in detail with reference to the accompanying drawings.

Figure 2:
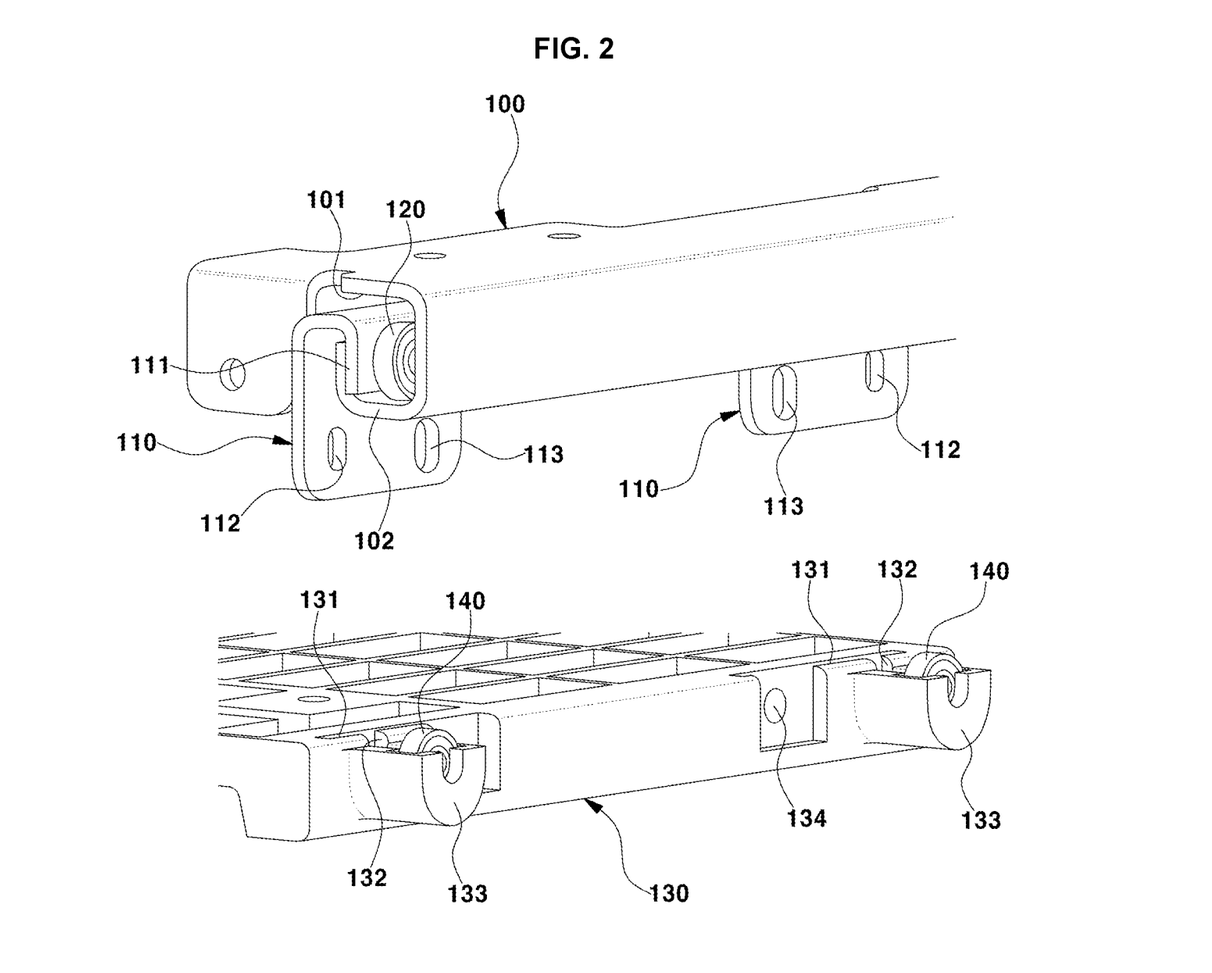
FIGS. 2 to 4 are partially enlarged perspective diagrams sequentially showing an assembling process of a rail device for a vehicle seat according to an embodiment of the present disclosure.
Figure 3:
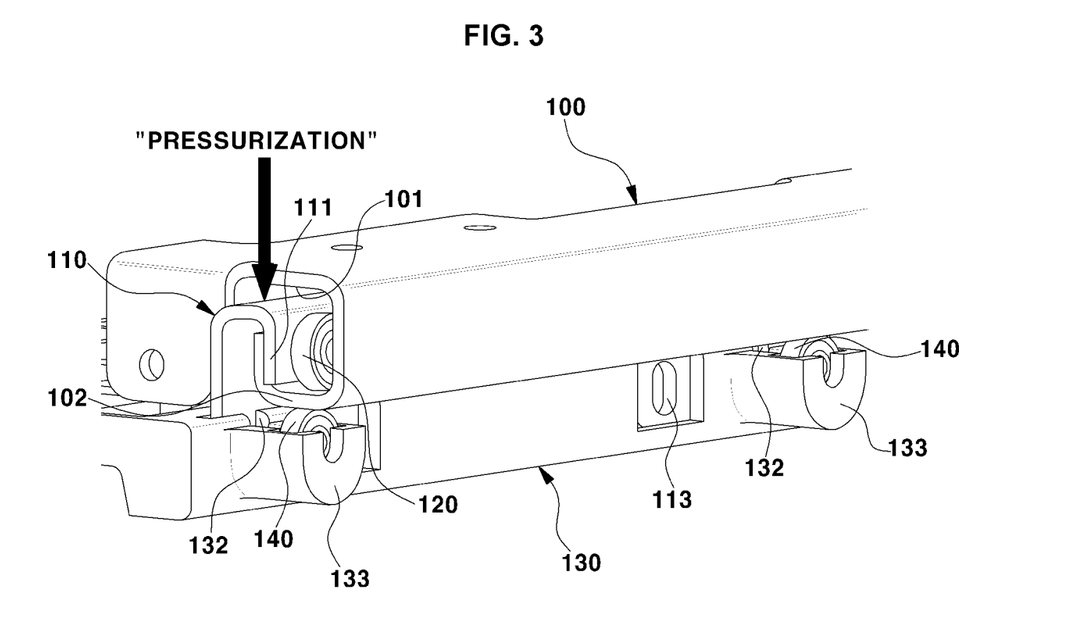
Figure 4:
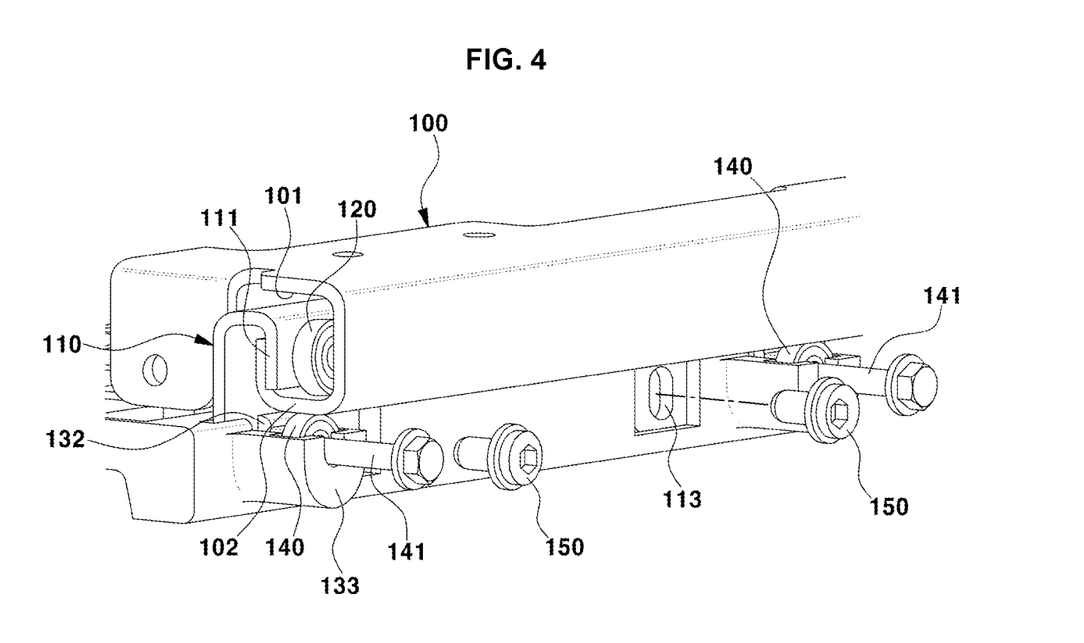
Figure 5:
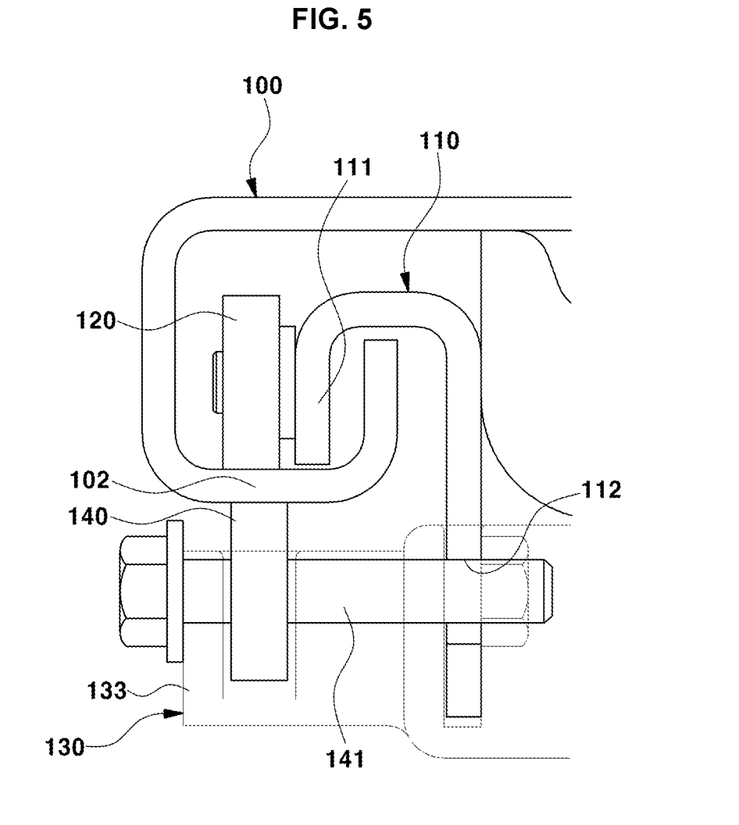
FIG. 5 is an enlarged cross-sectional diagram showing a main part of the rail device for the vehicle seat according to an embodiment of the present disclosure.

FIGS. 2 to 4 are partially enlarged perspective diagrams sequentially showing an assembling process of a rail device for a vehicle seat according to an embodiment of the present disclosure, and FIG. 5 is an enlarged cross-sectional diagram showing a main part of the rail device for the vehicle seat according to an embodiment of the present disclosure, and a reference numeral wo in each drawing indicates an upper rail.

The upper rail 100 is a component that moves in front and rear directions in order to adjust the front and rear positions of a seat, and is provided in a structure in which an opening 101 is formed on an inner portion, and a first bearing support 102 having an approximately "U"-shaped cross-sectional shape is formed inside the opening 101.

A lower rail no supporting the forward and backward movement of the upper rail 100 is coupled to the upper rail 100.

To this end, the lower rail no is provided in a structure in which a bearing connection end 111 having an inverted "U"-shaped cross-sectional shape inserted into the first bearing support 102 through the opening 101 of the upper rail 100 is formed on an upper portion, and a bearing contact adjustment hole 112 vertically elongated is formed on a lower portion.

At this time, the upper bearing 120 is rotatably connected to the bearing connection end 111 of the lower rail no and is in close contact with the floor of the first bearing support 102 of the upper rail 100 to be rollable.

Meanwhile, a lower plate 130 is mounted on a floor panel (not shown) constituting the inner floor of the vehicle.

The lower plate 130 is provided in a structure in which a fastening groove 131 into which a lower end of the lower rail 110 is inserted is formed on an outer portion, a bearing shaft mounting hole 132 matched with the bearing contact adjustment hole 112 of the lower rail no is formed on an outer wall surface portion of the fastening groove 131, and a second bearing support 133 with an opened upper portion is formed to protrude outside the fastening groove 131.

At this time, the lower bearing 140 is rotatably disposed inside the second bearing support 133.

In addition, a bearing shaft 141 penetrating the center of the lower bearing 140 from an outer surface of the second bearing support 133 is inserted and fastened.

Here, an assembling process of the rail device according to an embodiment of the present disclosure will be described as follows.

As shown in FIG. 2, first, the bearing connection end in of the lower rail no and the upper bearing 120 are inserted into the first bearing support 102 of the upper rail 100, and the lower bearing 140 is inserted into and disposed inside the second bearing support 133 of the lower plate 130.

At this time, the upper bearing 120 is in close contact with a floor, which is an upper surface of the first bearing support 102, to be rollable.

Next, as shown in FIG. 3, a lower end of the lower rail no in which the bearing contact adjustment hole 112 is formed is inserted into the fastening groove 131 of the lower plate 130 and the lower rail no is pressurized downward.

Accordingly, as the lower rail no is pressurized downward, the lower bearing 140 disposed inside the second bearing support 133 of the lower plate 130 is in close contact with a bottom surface of the upper rail 100, that is, a bottom surface of the first bearing support 102, to be rollable.

At this time, as the bearing contact adjustment hole 112 of the lower rail no is formed in a vertically elongated shape, the bearing contact adjustment hole 112 of the lower rail no is in a state of being matched with the bearing shaft mounting hole 132 of the lower plate 130 even when the lower rail no is pressurized downward until the lower bearing 140 is in close contact with the bottom surface of the first bearing support 102.

Next, as shown in FIG. 4, the bearing shaft 141 with a bolt shape is fastened by a screw and tightened by a nut to the bearing shaft mounting hole 132 and the bearing contact adjustment hole 112 by penetrating the center of the lower bearing 140 from the outer surface of the second bearing support 133, so that the lower end of the lower rail no is tightened and thus the lower rail no is in a state of being fixed.

At this time, in order to secure the fixed state of the lower rail no, a lower portion of the lower rail no is further formed with a lower rail guide hole 113 vertically elongated, and the lower plate 130 is further formed with a lower rail mounting hole 134.

Accordingly, as shown in FIG. 4, a fixing bolt 150 is inserted into and fastened to the lower rail guide hole 113 and the lower rail mounting hole 134, so that the lower bearing 140 is pressurized downward until the lower bearing 140 is in close contact with the bottom surface of the first bearing support 102, and the located lower rail no may be maintained in a state of being firmly fixed.

Accordingly, as shown in FIG. 5, the first bearing support 102 of the upper rail 100 is in a state of being in close contact with the upper bearing 120 and the lower bearing 140 without any gap.

In other words, the upper bearing 120 is in a state of being in close contact with the floor, which is the upper surface of the first bearing support 102 of the upper rail 100, to be rollable without the gap, and the lower bearing 140 is in a state of being in close contact with the bottom surface of the first bearing support 102 of the upper rail 100 to be rollable without the gap.

Accordingly, when the upper rail 100 moves forward or rearward, the upper bearing 120 and the lower bearing 140 are rotated in place by a friction force to support the forward or rearward movement of the upper rail 100, so that the upper rail 100 may be smoothly moved between the upper bearing 120 and the lower bearing 140 without movement and occurrence of noise.

Figure 6:
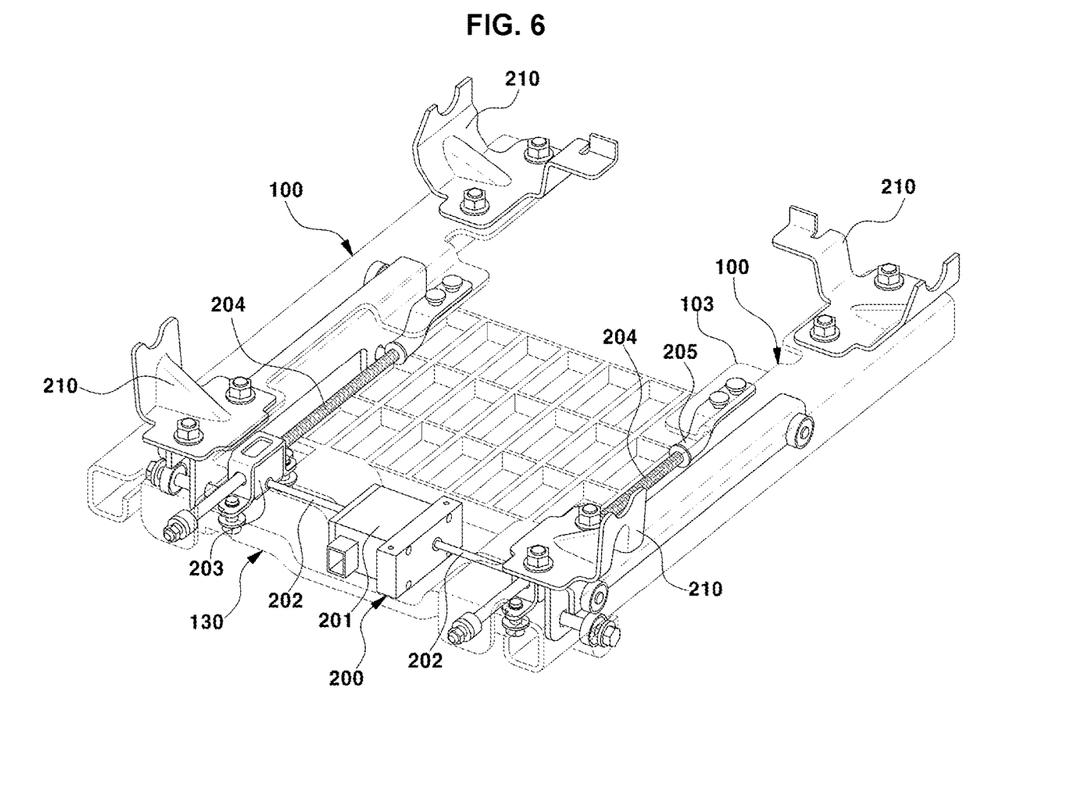
FIG. 6 is a perspective diagram showing an assembling completion state of the rail device for the vehicle seat according to an embodiment of the present disclosure.

Meanwhile, the upper rail 100 may be moved by an electric drive device 200 in the front and rear directions.

To this end, the lower plate 130 is mounted with the electric drive device 200 for moving the upper rail 100 in the front and rear directions, and a connection plate 103 connected to the electric drive device 200 is formed on an inner portion of the upper rail 100.

As shown in FIG. 6, the electric drive device 200 may be configured to include a motor 201 mounted on the lower plate 130, a gear box 203 connected to an output shaft 202 of the motor 201, a lead screw 204 fastened to an output gear (not shown) of the gear box 203 to be rotatable in place, and a slider 205 mounted on the connection plate 103 so that the lead screw 204 is rotatably fastened.

Accordingly, when a rotation force generated by driving the motor 201 is transmitted to the gear box 203 through the output shaft 202, deceleration is performed by a predetermined heat of a gear mounted within the gear box 203, and the lead screw 204 fastened to the output gear of the gear box 203 is rotated in place.

Subsequently, the slider 205 mounted on the connection plate 103 moves forward or rearward along the lead screw 204 as the lead screw 204 is rotated in place, and the upper rail 100 formed with the connection plate 103 moves forward or rearward.

In other words, the upper rail 100 receives the rolling support of the upper bearing 120 and the lower bearing 140 to smoothly move forward or rearward without vertical movement and occurrence of noise.

At this time, a seat cushion fastening bracket 210 for assembling with the seat cushion of the configuration of the seat is mounted on the upper portion of the upper rail 100.

Accordingly, when the upper rail 100 moves forward or rearward, the seat cushion fastening bracket 210 and the seat mounted thereon move forward or rearward together, so that the front and rear positions of the seat are adjusted.

Figure 7:
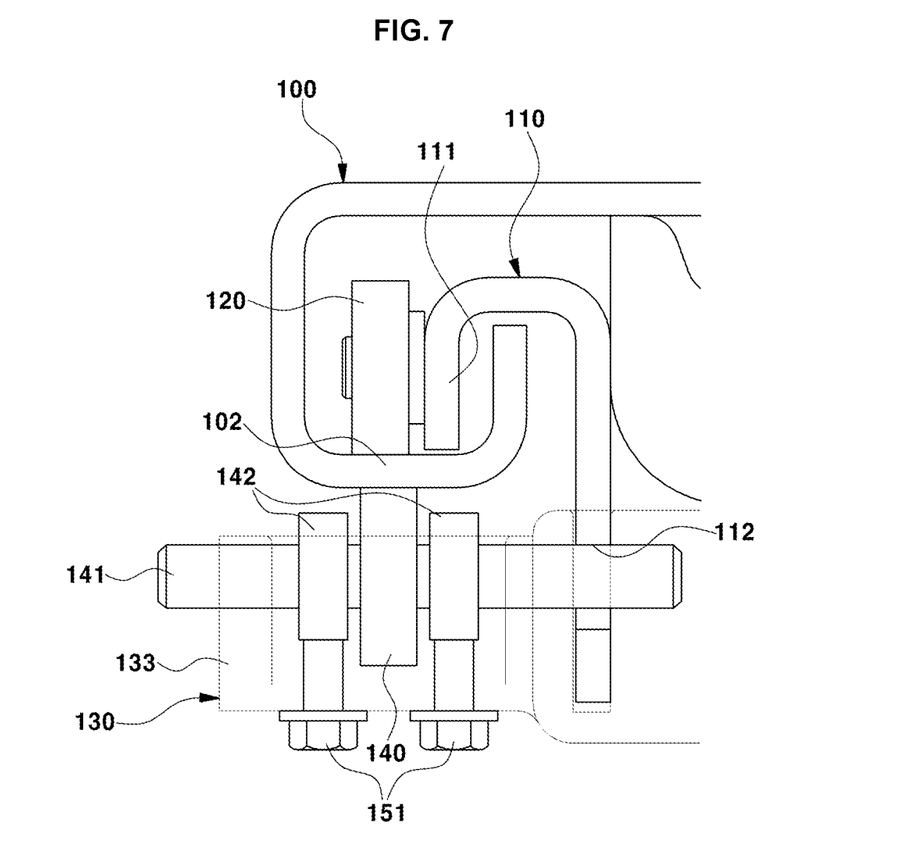
FIG. 7 is a cross-sectional diagram showing a rail device for a vehicle seat according to another embodiment of the present disclosure.

FIG. 7 is a cross-sectional diagram showing a rail device for a vehicle seat according to another embodiment of the present disclosure.

In the present embodiment of the present disclosure, the lower bearing 140 being in close contact with the bottom surface of the first bearing support 102 of the upper rail 100 using a height adjustment bolt 151.

To this end, as shown in FIG. 7, left and right positions of the lower bearing 140 of the bearing shaft 141 are mounted with height adjustment blocks 142, and the height adjustment bolt 151 that pushes upward and tightens the height adjustment block 142 is inserted into and fastened to the bottom portion of the second bearing support 133 of the lower plate 130.

Accordingly, the bearing shaft 141 and the lower bearing 140 move upward together while the height adjustment bolt 151 pushes the height adjustment block 142 upward, so that the lower bearing 140 may be easily in close contact with the bottom surface of the first bearing support 102 of the upper rail 100.

At this time, as described above, the fixing bolt 150 is inserted into and fastened to the lower rail guide hole 113 and the lower rail mounting hole 134, so that the lower rail no may be maintained in a state of being firmly fixed in a state where the upper bearing 120 is in close contact with the upper surface of the first bearing support 102.

Accordingly, the upper bearing 120 is in a state of being in close contact with the floor, which is the upper surface of the first bearing support 102 of the upper rail 100 to be rollable without the gap, and the lower bearing 140 also is in a state of being in close contact with the bottom surface of the first bearing support 102 of the upper rail 100 by the height adjustment bolt 151 to be rollable without the gap.

Accordingly, when the upper rail 100 moves forward or rearward, the upper bearing 120 and the lower bearing 140 are rotated in place by a friction force to support the forward or rearward movement of the upper rail 100, so that the upper rail 100 may be smoothly moved between the upper bearing 120 and the lower bearing 140 without vertical movement and occurrence of noise.

Figure 8:
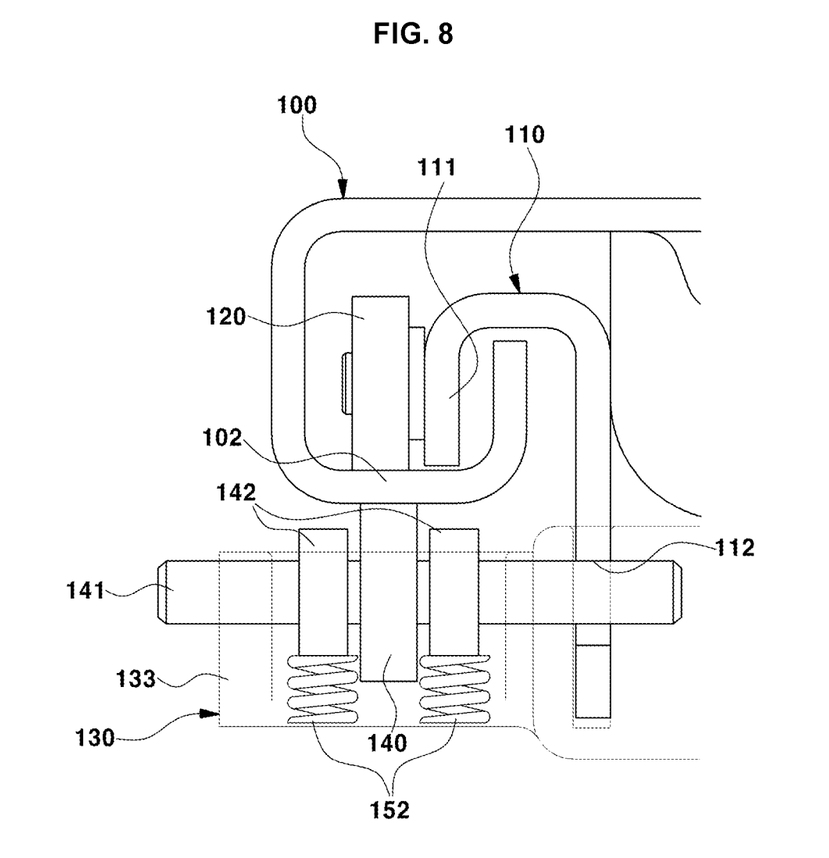
FIG. 8 is a cross-sectional diagram showing a rail device for a vehicle seat according to still another embodiment of the present disclosure.

FIG. 8 is a cross-sectional diagram showing a rail device for a vehicle seat according to still another embodiment of the present disclosure.

In the present embodiment of the present disclosure, the lower bearing 140 may be in close contact with the bottom surface of the first bearing support 102 of the upper rail 100 using a height adjustment spring 152.

To this end, as shown in FIG. 8, the left and right positions of the lower bearing 140 of the bearing shaft 141 are mounted with the height adjustment blocks 142, and the height adjustment spring 152 that pushes the height adjustment block 142 upward is mounted on a floor of the second bearing support 133 of the lower plate 130.

Accordingly, as an elastic restoring force of the height adjustment spring 152 acts on the bottom portion of the height adjustment block 142, the bearing shaft 141 and the lower bearing 140 move upward together while the height adjustment block 142 is pushed and moves upward, so that the lower bearing 140 may be easily in close contact with the bottom surface of the first bearing support 102 of the upper rail 100.

At this time, as described above, the fixing bolt 150 is inserted into and fastened to the lower rail guide hole 113 and the lower rail mounting hole 134, so that the lower rail no may be maintained in a state of being firmly fixed in a state where the upper bearing 120 is in close contact with the upper surface of the first bearing support 102.

Accordingly, the upper bearing 120 is in a state of being in close contact with the floor, which is the upper surface of the first bearing support 102 of the upper rail 100 to be rollable without the gap, and the lower bearing 140 also is in a state of being in close contact with the bottom surface of the first bearing support 102 of the upper rail 100 by the height adjustment spring 152 to be rollable without the gap.

Accordingly, when the upper rail 100 moves forward or rearward, the upper bearing 120 and the lower bearing 140 are rotated in place by a friction force to support the forward or rearward movement of the upper rail 100, so that the upper rail 100 may be smoothly moved between the upper bearing 120 and the lower bearing 140 without vertical movement and occurrence of noise.

While various embodiments of the present disclosure have been described above in detail, the scope of the present disclosure is not limited to the aforementioned embodiments, and various modifications and improvements by those skilled in the art using the basic concepts of embodiments of the present disclosure defined in the appended claims are included in the scope of the present disclosure.

What is claimed is:

1. A rail device for a vehicle seat, the rail device comprising:
    an upper rail;
    a first bearing support on an inner portion of the upper rail;
    a lower rail;
    a bearing connection end on an upper portion of the lower rail, wherein the bearing connection end is inserted into the first bearing support;
    a bearing contact adjustment hole on a lower portion of the lower rail, wherein the bearing contact adjustment hole is vertically elongated;
    an upper bearing rotatably connected to the bearing connection end and in close contact with a floor of the first bearing support;
    a lower plate;
    a fastening groove on an outer portion of the lower plate, wherein a lower end of the lower rail is inserted in the fastening groove;
    a bearing shaft mounting hole on a wall surface portion of the fastening groove and matched with the bearing contact adjustment hole;
    a second bearing support outside the fastening groove, the second bearing support having an opened upper portion;
    a lower bearing rotatably disposed within the second bearing support; and
    a bearing shaft fastened to the bearing shaft mounting hole and the bearing contact adjustment hole by a screw by penetrating a center of the lower bearing from an outer surface of the second bearing support.

2. The rail device of claim 1, further comprising a lower rail guide hole on the lower portion of the lower rail, wherein the lower rail guide hole is vertically elongated.

3. The rail device of claim 2, wherein the lower plate comprises a lower rail mounting hole, and wherein a fixing bolt is inserted into and fastened to the lower rail guide hole and the lower rail mounting hole.

4. The rail device of claim 1, wherein:
    the lower plate is mounted with an electric drive device configured to move the upper rail in front and rear directions; and
    a connection plate is provided on the inner portion of the upper rail and connected to the electric drive device.

5. The rail device of claim 4, wherein the electric drive device comprises:
    a motor mounted on the lower plate;
    a gear box connected to an output shaft of the motor;
    a lead screw fastened to the gear box to be rotatable in place; and
    a slider mounted on the connection plate so that the lead screw is rotatably fastened.

6. The rail device of claim 1, further comprising a seat cushion fastening bracket mounted on an upper portion of the upper rail, wherein the seat cushion fastening bracket is configured for assembling with a seat cushion.

7. The rail device of claim 1, further comprising:
    a height adjustment block mounted on the bearing shaft; and
    a height adjustment bolt mounted on a bottom portion of the second bearing support and configured to push upward and tighten or release the height adjustment block.

8. The rail device of claim 1, further comprising:
    a height adjustment block mounted on the bearing shaft; and
    a height adjustment spring mounted on a floor of the second bearing support and configured to push the height adjustment block upward with an elastic restoring force.

9. A vehicle comprising:
    a vehicle body comprising a vehicle floor;
    a vehicle seat coupled to the vehicle floor by a rail device, wherein the rail device comprises:
        an upper rail;
        a first bearing support on an inner portion of the upper rail;
        a lower rail coupled to the vehicle floor;
        a bearing connection end on an upper portion of the lower rail, wherein the bearing connection end is inserted into the first bearing support;
        a bearing contact adjustment hole on a lower portion of the lower rail, wherein the bearing contact adjustment hole is vertically elongated;
        an upper bearing rotatably connected to the bearing connection end and in close contact with a floor of the first bearing support;
        a lower plate;

a fastening groove on an outer portion of the lower plate, wherein a lower end of the lower rail is inserted in the fastening groove;

a bearing shaft mounting hole on a wall surface portion of the fastening groove and matched with the bearing contact adjustment hole;

a second bearing support outside the fastening groove, the second bearing support having an opened upper portion;

a lower bearing rotatably disposed within the second bearing support; and a bearing shaft fastened to the bearing shaft mounting hole and the bearing contact adjustment hole by a screw by penetrating a center of the lower bearing from an outer surface of the second bearing support.

10. The vehicle of claim 9, wherein the rail device further comprises a lower rail guide hole on the lower portion of the lower rail, wherein the lower rail guide hole is vertically elongated.

11. The vehicle of claim 10, wherein the lower plate comprises a lower rail mounting hole, and wherein a fixing bolt is inserted into and fastened to the lower rail guide hole and the lower rail mounting hole.

12. The vehicle of claim 9, wherein:

the lower plate is mounted with an electric drive device configured to move the upper rail in front and rear directions; and a connection plate is provided on the inner portion of the upper rail and connected to the electric drive device.

13. The vehicle of claim 12, wherein the electric drive device comprises:

a motor mounted on the lower plate;

a gear box connected to an output shaft of the motor;

a lead screw fastened to the gear box to be rotatable in place; and a slider mounted on the connection plate so that the lead screw is rotatably fastened.

14. The vehicle of claim 9, further comprising:

a seat cushion fastening bracket mounted on an upper portion of the upper rail; and a seat cushion of the vehicle seat assembled with the seat cushion fastening bracket.

15. The vehicle of claim 9, further comprising:

a height adjustment block mounted on the bearing shaft; and a height adjustment bolt mounted on a bottom portion of the second bearing support and configured to push upward and tighten or release the height adjustment block.

16. The vehicle of claim 9, further comprising:

a height adjustment block mounted on the bearing shaft; and a height adjustment spring mounted on a floor of the second bearing support and configured to push the height adjustment block upward with an elastic restoring force.

\* \* \* \* \*